United States Patent [19]

Hirosawa

[11] Patent Number: 5,315,693
[45] Date of Patent: May 24, 1994

[54] METHOD AND SYSTEM FOR INTEGRATING IN A SINGLE IMAGE, CHARACTER AND GRAPHICAL INFORMATION BY EMPLOYING DATA OF DIFFERENT PIXEL RESOLUTION

[75] Inventor: Makoto Hirosawa, Kyoto, Japan

[73] Assignee: Dainippon Screen Mfg. Co., Ltd., Japan

[21] Appl. No.: 674,537

[22] Filed: Mar. 22, 1991

[30] Foreign Application Priority Data

Mar. 28, 1990 [JP] Japan .................................. 2-82597

[51] Int. Cl.⁵ .............................................. G06F 15/62
[52] U.S. Cl. .................... 395/128; 395/102; 395/133; 395/145; 395/147
[58] Field of Search ............... 395/102, 105, 109, 114, 395/117, 128, 129–132, 145–148, 153, 161; 358/447

[56] References Cited

U.S. PATENT DOCUMENTS

| | | | |
|---|---|---|---|
| 4,763,279 | 8/1988 | Kellam et al. | 395/109 |
| 4,947,260 | 8/1990 | Reed et al. | 358/447 |
| 5,029,115 | 7/1991 | Geraci | 395/131 |

Primary Examiner—Heather R. Herndon
Assistant Examiner—Almis Jankus
Attorney, Agent, or Firm—Ostrolenk, Faber, Gerb & Soffen

[57] ABSTRACT

An integrated image recorder (100) receives first pictorial image data from an input scanner (300) and stores the same in an image disk (150). The pixels of the picture are skipped at a predetermined rate to obtain second pictorial image data having a lower resolution. The second pictorial image data is transmitted to a front end processor (201, 202) and employed in editing/designing of a page as an integrated image. The integrated image is represented in a page description language and is delivered to the integrated image recorder. The integrated image recorder is operable to read out the first pictorial image data from the image disk and to convert the integrated image into a bit map using the first pictorial image. The integrated image is then delivered to an output scanner (190) and is recorded on a recording medium.

14 Claims, 4 Drawing Sheets

METHOD AND SYSTEM FOR INTEGRATING IN A SINGLE IMAGE, CHARACTER AND GRAPHICAL INFORMATION BY EMPLOYING DATA OF DIFFERENT PIXEL RESOLUTION

BACKGROUND OF THE INVENTION

1. Field of the Invention

The present invention relates to a method of and an apparatus for integrating respective images of a character, a graphic and a picture and recording an integrated image, used in an editing system, and more particularly, to a technique for outputting the integrated image in accordance with an arrangement of images which are compiled through a personal computer or the like.

2. Description of the Background Art

DTP (desk top publishing) systems have rapidly spread in recent years. The DTP system is constructed to easily make-up a page with respective images of a character, a graphic and a picture and to output the integrated image thus obtained as a result of such page-designing. A personal computer or a design work station is employed as a front end processor of the DTP system. In such a system, an operator designs a page with images of characters, graphics and pictures with the front end processor which generates a program which is expressed in a page description language. The page description language is symbolically written as "PDL" in general and such languages include "Postscript", "Interpress" and "DLL", for example. The program for a designed page is called as a page description program and is outputted through the front end processor.

When it is intended to express a high-resolution image of a picture such as a photograph, in some cases the image may have a greater amount of data than a conventional DTP system can process. Accordingly, a conventional DTP system has a problem in that the system can not produce an integrated image containing a high-resolution image of a picture.

SUMMARY OF THE INVENTION

The present invention is directed to a method of generating an integrated image having respective images of a character, a graphic and a picture and then recording the integrated image with image recording means provided in an integrated image recorder.

According to the present invention, an image of a picture is read to obtain first pictorial image data representing the image of the picture in a first resolution. The first pictorial image data is stored in memory means provided in an integrated image recorder.

The amount of the first pictorial image data is reduced to obtain a second pictorial image data representing the image of the picture in a second resolution smaller than the first resolution. The second pictorial image data is then stored in the memory means.

A front end processor coupled to the integrated image recorder is operated to designate a character and a graphic to be integrated with the image of the picture on an image plane corresponding to a page. The second pictorial image data is transferred from the memory means to the front end processor and the front end processor is operated to determine a layout of the picture, the character and the graphic on the image plane, thereby obtaining a page description program expressing an integrated image. The page description program is transferred to the integrated image recorder.

The first pictorial image data is read out from the memory means in accordance with the page description program, and the integrated image is converted into a bit-mapped image while using the first pictorial image data for a pictorial part of first integrated image to thereby obtain in a buffer memory an integrated image data representing the integrated image.

Then, the image recording means is enabled to record the integrated image on a recording medium as a function of the integrated image data.

In a preferred embodiment of the present invention, the reduction of the first pictorial image data is attained by skipping pixels of the first pictorial image data at a predetermined skipping ratio.

The present invention is also directed to an integrated image recorder for recording an integrated image having respective images of a character, a graphic and a picture.

According to the present invention, the integrated image recorder comprises: (a) first interface means for receiving a first pictorial image data representing an image of a picture from an image input device; (b) means for reducing the amount of the first pictorial image data to obtain a second pictorial image data representing the image of the picture in a second resolution smaller than the first resolution; (c) memory means for storing the first and second pictorial image data with a file name; and (d) second interface means for transmitting the second pictorial image data from the memory means to a front end processor coupled to the integrated image recorder and for receiving from the front end processor a image description program representing an integrated image in a page description language.

The front end processor is operable to obtain the page description program through integrating an image of the picture represented by the second pictorial image data with respective images of a character and a graphic on an image plane in the page description language.

The integrated image recorder further comprises: (e) means for converting the integrated image into a bit-mapped image as a function of the page description program and the first pictorial image data; (f) buffer memory means for storing the bit-mapped image data of the integrated image; and (g) recording means, which may be an image scanner, for recording the integrated image on a recording medium as a function of the bit-mapped image data.

Since the second pictorial image data having a small data amount is employed in the front end processor and the first pictorial image data having a high resolution is used in output, an integrated image can be recorded in a high quality in a DTP system.

Accordingly, an object of the present invention is to obtain a method of and an apparatus for easily producing an integrated image containing a high-quality image of a picture.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
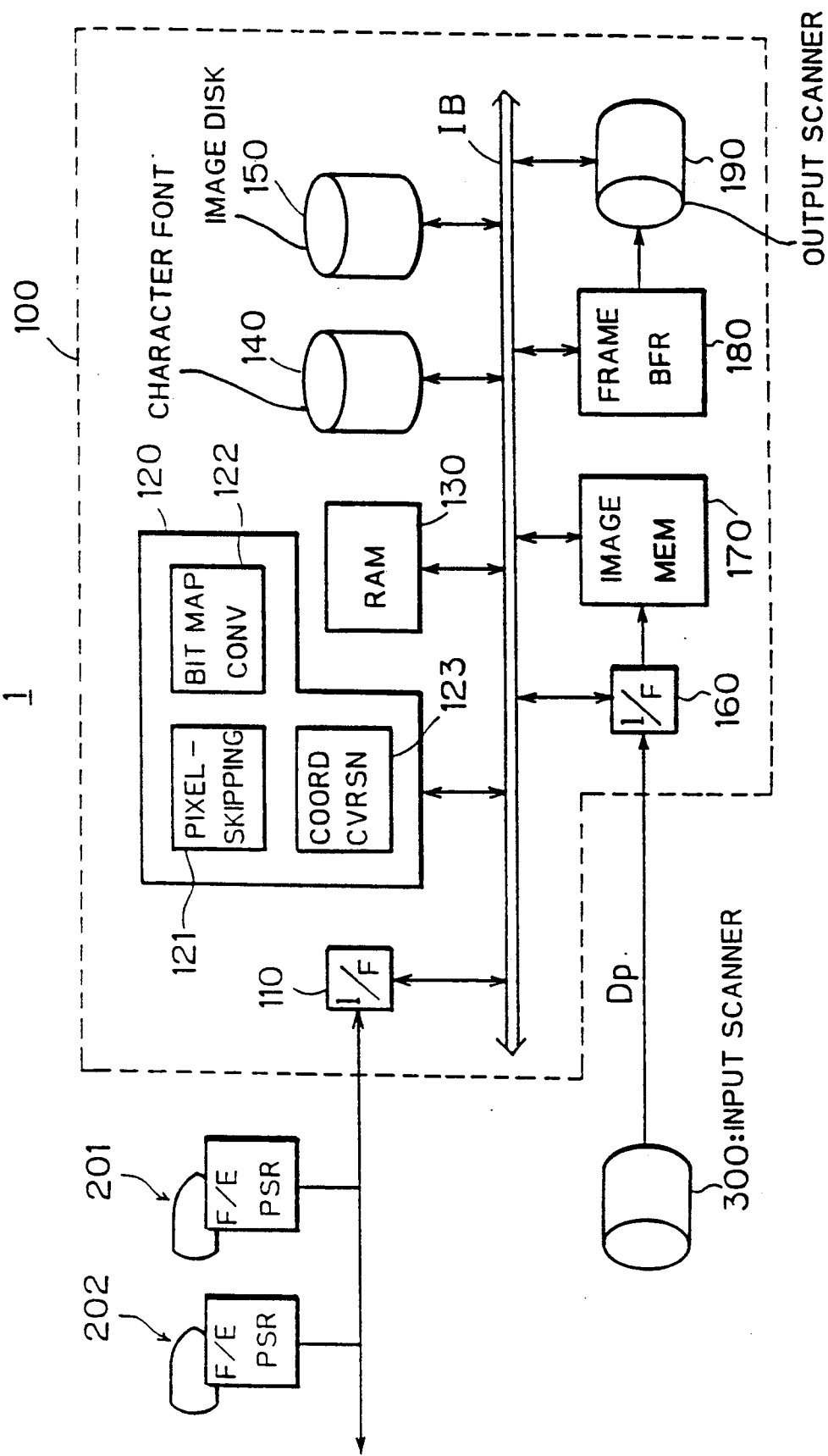
FIG. 1 is a block diagram illustrating an editing design system which includes an integrated image recorder in accordance with a preferred embodiment of the present invention.

FIG. 1 is a block diagram showing an editing design system in which an integrated image recorder in accordance with a preferred embodiment of the present invention is provided. This design system 1 comprises an integrated image recorder 100, front end processors 201 and 202 and an input image scanner 300. The integrated image recorder 100 is connected to front end processors 201 and 202 through a LAN (local area network). Personal computers or work stations are employed as the front end processors 201 and 202.

The integrated image recorder 100 comprises a front end interface circuit 110, a CPU 120, a RAM 130, a character front disk 140, an image disk memory 150, an interface circuit 160 connected with the input scanner 300, an image memory 170, a frame buffer 180 and an output image scanner 190. These components 110-190 are connected to each other through an internal bus IB. The CPU 120 is operable to carry out various processes defined by software programs and equivalently comprises pixel-skipping means 121, bit map conversion means 122 and coordinate conversion means 123, which will be more fully described later.

Figure 2:
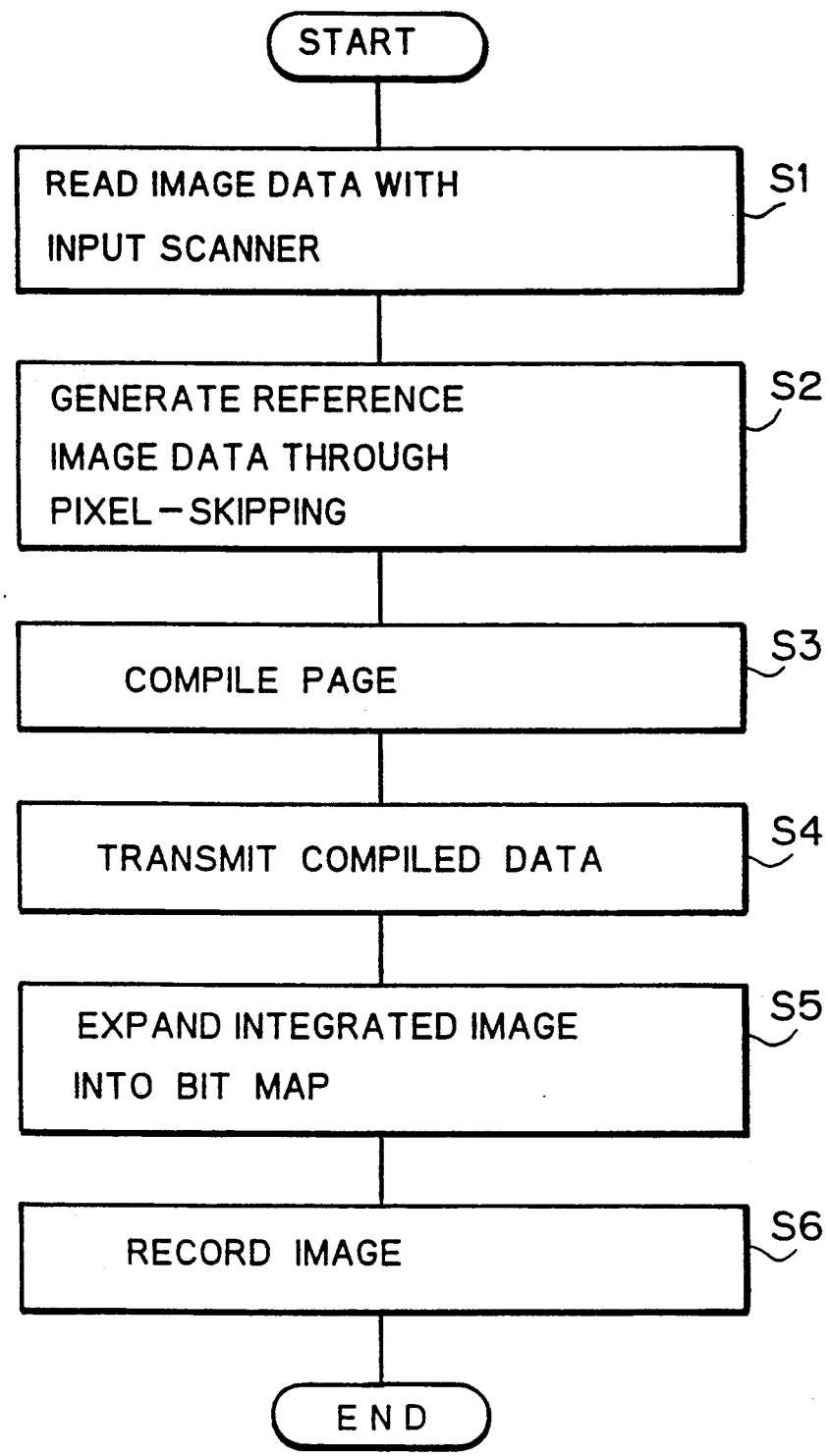
FIG. 2 is a flowchart illustrating a procedure for producing an image in accordance with the preferred embodiment.

FIG. 2 is a flowchart showing a procedure for compiling a plurality of images to design a page and for outputting the same by employing the design system 1.

To start in step S1, the input scanner 300 photoelectrically reads an image of a picture prepared for generating an integrated image, to thereby obtain image data $D_P$. This image data $D_P$ are delivered to the interface 160 and then stored in the image memory 170. The image data $D_P$ thus stored in the image memory 170 are stored in the image disk 150 as an image file in response to a command given from the CPU 120. The image disk 150 has enough capacity to store image data of a plurality of images. The image memory 170 may be constructed so as to have a capacity to store image data of the whole image plane of the integrated image to be generated, or it may be designed to store image data of a portion of an image plane and write the same one after another to the image disk 150.

Figure 3:
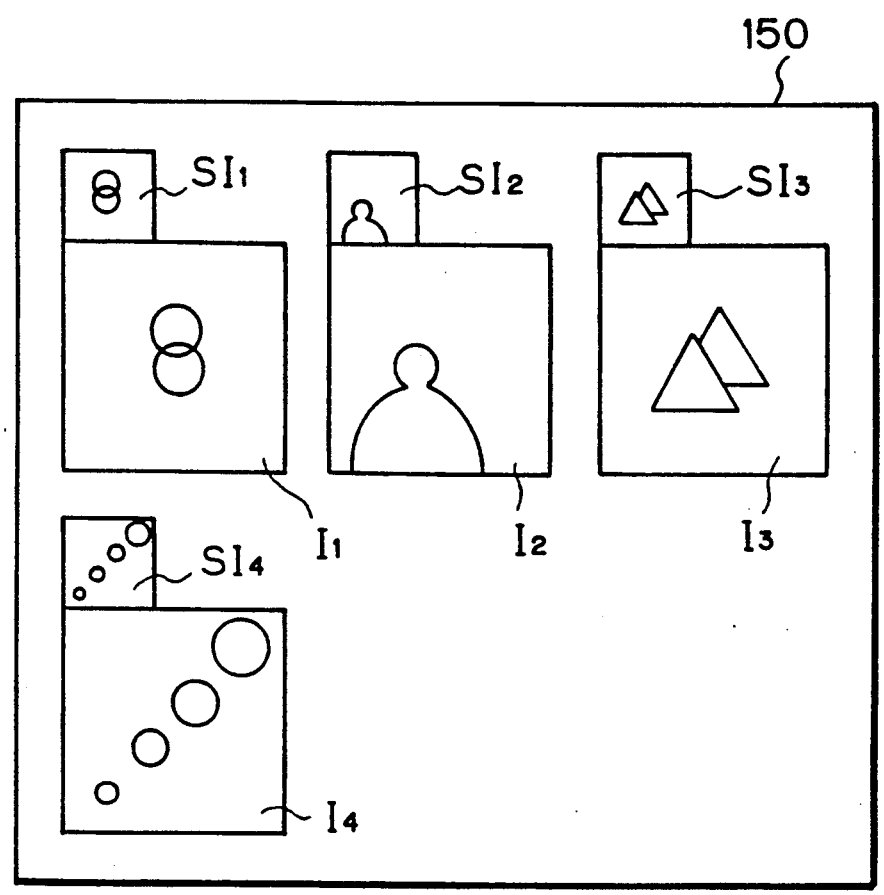
FIG. 3 is a conceptual view illustrating image files stored in an image disk.

In step S2, the pixel-skipping means 121 in the CPU 120 conducts pixel-skipping processing on respective image data stored in the image disk 150 thereby to produce skipped image data, which is hereafter referred to as "reference image data". That is, respective pixels on the original image data are skipped at a designated skipping rate to reduce the amount of the image data. Alternatively, in order to reduce the amount of data, the original image data may be spatially compressed as disclosed in Japanese Laid Open Patent 60-176365 (1975) and data thus obtained may be employed as the reference image data. This reference image data is stored in the image disk 150. FIG. 3 is a conceptual view showing the original images $I_1$-$I_4$ stored in the image disk 150 and the pixel-skipped images $SI_1$-$SI_4$ which are obtained by skipping the pixels in the original images. The pixel-skipped images $SI_1$-$SI_4$ are referred as "reference images" hereinafter. Respective ones of the original images $I_1$-$I_4$ and the corresponding reference images $SI_1$-$SI_4$ are paired with each other and treated as a set under their respective file names. The reference images $SI_1$-$SI_4$ have smaller resolutions and smaller amounts of image data than the respective original images $I_1$-$I_4$.

Figure 4:
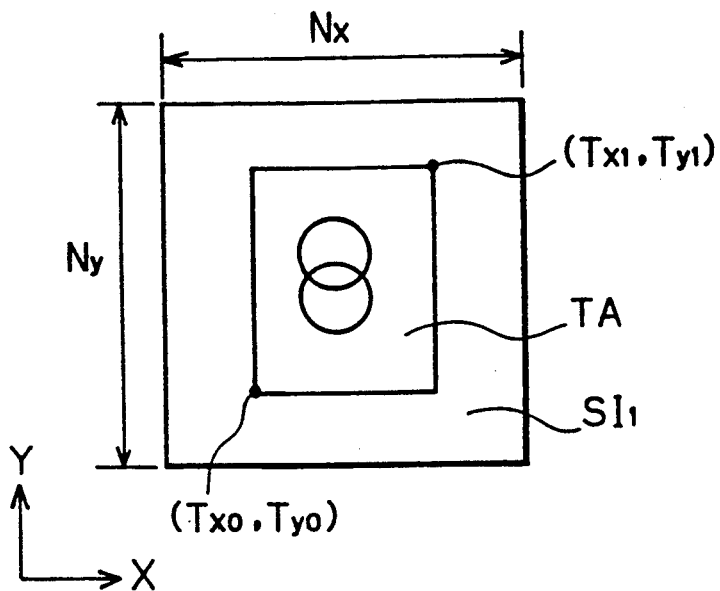
FIG. 4 is a conceptual view illustrating a form of a skipped reference image.

In step S3, an operator designes or compiles a page by employing the front end processor 201 (or 202). The shape and the position of a character or a graphic can be arbitrarily designated on the front end processor 201. When an image of a picture is arranged in the page, the front end processor 201 issues a demand through the LAN to the integrated image recorder 100 to cause the recorder 100 transfer the reference image data. In response to this demand, the integrated image recorder 100 transfers the reference image data of the designated image from the image disk 150 to the front end processor 201. At this time, the integrated image recorder 100 transfers following data to the front end processor 201;

a1. the file name of the image data, a2. the reference image data itself, a3. pixel numbers $N_x$ and $N_y$ included in the reference image in directions X and Y, respectively (see the constitution of the reference image $SI_1$ shown in FIG. 4), a4. the number of bits per pixel of the image, and a5. a color designation of either monochrome or color.

Figure 5:
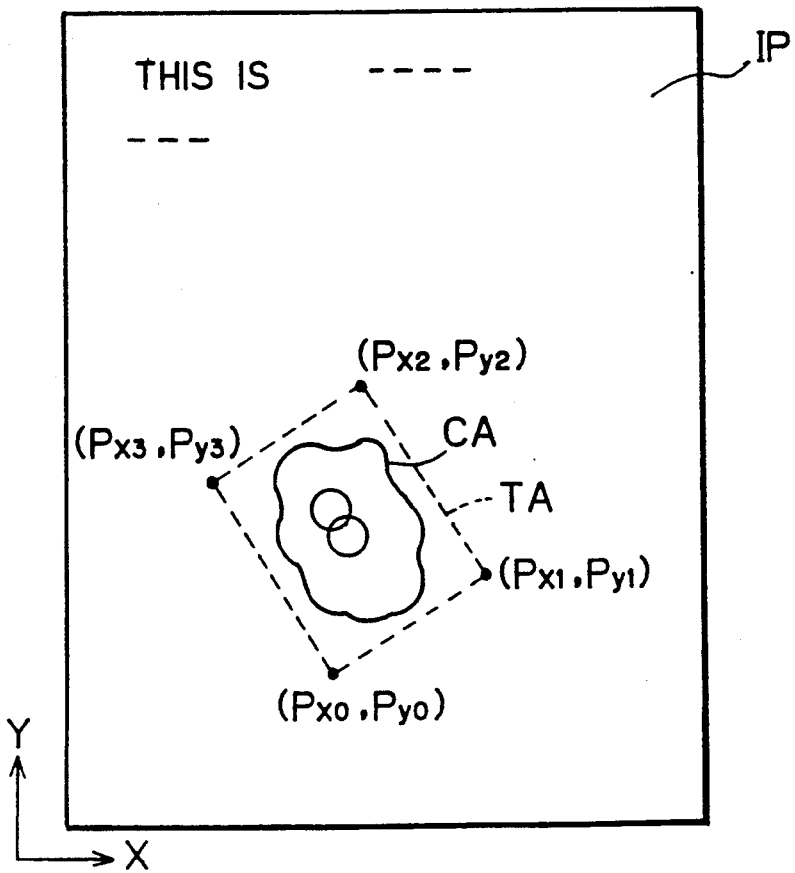
FIG. 5 is a conceptual view illustrating an integrated image.

By employing the front end processor 201, the operator arranges a layout of images to be included in the page on a monitor CRT provided in the processor 201. At the same time, the operator instructs on a coordinate convertion processing to be employed, e.g., reduction rotation or the like for respective image of characters, graphics and pictures. The operator further specifies a trimming area TA (FIG. 4) encompassing a portion of the reference image $SI_1$ to be used in the page. The trimming area TA has a rectangular shape, for example, and is represented by coordinates $(T_{x0}, T_{y0})$ and $(T_{x1}, T_{y1})$ of two vertexes or trimming points located opposed to each other with respect to the rectangular shape. When the image of only a portion of the trimming area TA is used, a clipping area CA, which is an arbitrary graphic, may be designated in the trimming area TA to define a part of the picture image to be used in an integrated image. FIG. 5 is a conceptual view showing an image IP integrated within a page (an integrated image). Trimming points $(T_{x0}, T_{y0})$ and $(T_{x1}, T_{y1})$ of the reference image correspond to points $(P_{x0}, P_{y0})$ and $(P_{x2}, P_{y2})$ in the integrated image, respectively.

After the image designing of a page is completed, the compiled data is transmitted from the front end processor 201 to the integrated image recorder 100. This compiled data includes the following data with respect to the images;

b1. The program in which the integrated image is defined in the aforementioned page description language (PDL), one example of which is described in "POSTSCRIPT language Reference Manual" Addison-Wesley Publishing Company, Inc., 1986 and 1985, b2. the file name of the image data on the image of the employed picture, b3. pixel numbers $N_x$ and $N_y$ included in the reference image in directions X and Y, respectively, b4. the number of bits per pixel, b5. the designation monochrome or color, b6. the coordinates $(T_{x0}, T_{y0})$ and $(T_{x1}, T_{y1})$ of the trimming points, b7. the coordinates $(P_{x0}, P_{y0})$ and $(P_{x3}, P_{y3})$ of the trimming area TA on the page in which the trimming area is arranged, and b8. graphic data representing the outline of the clipping area CA.

In step S5, the integrated image recorder 100 converts the integrated image in the page into a bit-mapped iamge on the frame buffer 180 on the basis of these data. Characters included in the integrated image are represented by predetermined character codes in the image description program. Then, the bit map conversion means 122 in the CPU 120 read out outline font data which is stored in the character font disk 140 in accordance with these character codes, while converting the characters into a bit-mapped image on the frame buffer 180 on the basis of the size and the position of the characters designated in the image description program. The images of the graphics included in the integrated image are converted into a bit-mapped image on the frame buffer 180 in accordance with the shape and the position which are designated in the image description program. For the reference image $SI_1$ of the picture, on the other hand, the original image data which is not skipped is read out from the image disk 150, and the image within the area which is designated as the clipping area CA is clipped and extracted to be converted into a bit-mapped image on the frame buffer 180. Respective bit maps of the characters, the graphics and the pictures are generated on a same bit map plane, thereby obtaining a resultant bit map including these images. In the case where coordinate conversion processing such as enlargement, reduction, rotation or the like for respective image of characters, graphics or pictures are designated in the image description program, the coordinate conversion means 123 in the CPU 120 conduct the coordinate conversion processings.

Respective image files stored in the image disk 150 contain data designating the pixel-skipping rate of the reference images $SI_1$–$SI_4$. On the basis of the skipping rate and the coordinates $(T_{x0}, T_{y0})$ and $(T_{x1}, T_{y0})$ of the trimming points within the reference image $SI_1$, the CPU 120 calculates the coordinates of the trimming points on the original image $I_1$ which is not skipped.

In the process step S6, the data of the integrated image whose resultant bit map is expanded in the frame buffer 180 is outputted to the scanner 190 and thereby the integrated image is recorded on a photosensitive film or a photosensitive paper and is employed as a block copy in printing of high quality.

In the above embodiment, a front end processor such as a personal computer or the like is employed for designating pages and an integrated image thus compiled is expressed in the page description language. Furthermore, since a picture of the image which is employed in compiling has a low resolution, that brings an advantage in that an integrated image containing a high-quality image can be easily compiled.

As has been described above, according to the present invention, since the reference image data skipped by the skipping means is outputted externally of the device, the compilation of an image can be easily carried out. Furthermore, since the integrated image is recorded on the basis of the image description program which is produced as the result of compilation and the image data which are not skipped, that brings an effect in that an integrated image including a high-quality image can be easily produced.

Although the present invention has been described and illustrated in detail, it is to be clearly understood that the same is by way of illustration and example only and is not to be taken by way of limitation. The spirit and scope of the present invention should be limited only be the terms of the appended claims.

What is claimed is:

1. A method of generating an integrated image including images of a character, a graphic and a picture and then recording said integrated image with an image recording means provided in an integrated image recorder, comprising the steps of:

(a) reading an image of a picture to obtain first pictorial image data representing said image of said picture in a first resolution and storing said first pictorial image data in memory means provided in the integrated image recorder;

(b) reducing the amount of said first pictorial image data to obtain second pictorial image data representing said image of said picture in a second resolution lower than that of said first resolution and then storing said second pictorial image data in said memory means;

(c) operating a front end processor coupled to said integrated image recorder to designate a character and a graphic to be integrated with said image of said picture on an image plane corresponding to a page;

(d) transferring said second pictorial image data from said memory means to said front end processor;

(e) operating said front end processor to determine a layout of said picture, said character and said graphic on said image plane, thereby obtaining a page description program for the integrated image;

(f) transferring said page description program to said integrated image recorder;

(g) reading out said first pictorial image data from said memory means;

(h) converting said integrated image into a bit-mapped image data while using said first pictorial image data for a pictorial part of said integrated image to thereby obtain in a buffer memory an integrated image data representing the integrated image; and (i) enabling said image recording means to record said integrated image on a recording medium as a function of said bit-mapped image data, wherein the step (b) comprises the step of:

(b-1) skipping over pixels of said first pictorial image data at a predetermined rate to obtain said second pictorial image data, wherein the step (d) comprises the steps of:

(d-1) directing said integrated image recorder to transfer said second pictorial image data to said front end processor;

(d-2) reading out said second pictorial image data from said memory means; and (d-3) transferring said second pictorial image data to said front end processor.

2. The method of claim 1, wherein the step (d-3) comprises the steps of:

(d-4) transferring to said front end processor said second pictorial image data together with first accompanying data defining:

numbers of pixels forming said second pictorial image data in two directions defined on said picture.

3. The method of claim 2, wherein
said first accompanying data further includes:
a file name of said second pictorial image data;
a number of bits representing said second pictorial image data per pixel; and
data designating whether said second pictorial image is monochrome or color.

4. The method of claim 1, wherein
the step (e) comprises the step of:
(e-1) determining a trimming area on said image of said picture represented by said second pictorial image data.

5. The method of claim 4, wherein
the step (e) further comprises the step of:
(e-2) determining a clipping area in said trimming area to designate a part of said image of said picture to be used in said integrated image.

6. The method of claim 5, wherein
the step (f) comprises the step of:
(f-1) transferring said page description program to said integrated image recorder together with second accompanying data including;
said numbers of pixels forming said second pictorial image data in said two directions.

7. The method of claim 6, wherein
said second accompanying data further includes:
said file name of said second pictorial image data;
a number of bits representing said integral image per pixel; and
data designating whether said integrated image is monochrome or color.

8. The method of claim 7, wherein
said second accompanying data further includes:
data designating a position of said trimming area and a shape of said clipping area on said image plane.

9. An integrated image recorder for recording an integrated image including images of a character, a graphic and a picture, comprising:
(a) first interface means for receiving first pictorial image data of a given amount representing an image of a picture obtained from an input device;
(b) means for reducing the amount of said first pictorial image data to obtain second pictorial image data representing said image of said picture in a second resolution lower than said first resolution;
(c) memory means for storing said first and second pictorial image data under a file name;
(d) second interface means for transmitting said second pictorial image data from said memory means to a front end processor coupled to said integrated image recorder and for receiving from said front end processor a page description program representing an integrated image in a page description language,
said front end processor being effective to integrate an image of said picture represented by said second pictorial image data with respective images of a character and a graphic on an image plane corresponding to a page to generate said page description program;
(e) means for converting said integrated image into a bit-mapped image as a function of said image description program and said first pictorial image data to obtain image data of said integrated image;
(f) buffer memory means for storing said image data of said integrated image; and
(g) recording means for recording said integrated image on a recording medium as a function of said image data of said integrated image,
wherein the means (b) comprises:
(b-1) means for skipping pixels of said first pictorial image data at a predetermined rate to obtain said second pictorial image data, wherein
the means (e) comprises:
(e-1) means for converting coordinates of said character, said graphic and said picture on said image plane.

10. The integrated image recorder of claim 9, wherein
the means (e) further comprises:
(e-2) means for determining a trimming area of said picture in accordance with a trimming data received from said front end processor.

11. The integrated image recorder of claim 10, wherein
the means (e) further comprises:
(e-3) means for clipping a part of said picture in said trimming area in accordance with a clipping data received from said front end processor; and
(e-4) means for expanding into said bit-mapped image said part of said picture clipped out by said means (e-3).

12. A method of generating an integrated image, including images of a character and a picture, and then recording said integrated image with an image recording means provided in an integrated image recorder, comprising the steps of:
(a) reading an image of a picture to obtain first pictorial image data representing said image of said picture in a first resolution and storing said first pictorial image data in memory means provided in the integrated image recorder;
(b) reducing the amount of said first pictorial image data to obtain second pictorial image data representing said image of said picture in a second resolution lower than said first resolution and then storing said second pictorial image data in said memory means;
(c) operating a front end processor coupled to said integrated image recorder to designate a character to be integrated with said image of said picture on an image plane corresponding to a page;
(d) transferring said second pictorial image data from said memory means to said front end processor;
(e) operating said front end processor to determine a layout of said picture and said character on said image plane to thereby obtain a page description program for the integrated image;
(f) transferring said page description program to said integrated image recorder;
(g) reading out said first pictorial image data from said memory means;
(h) converting said integrated image into a bit-mapped image data while using said first pictorial image data for a pictorial part of said integrated image data representing the integrated image; and
(i) enabling said image recording means to record said integrated image on a recording medium as a function of said bit-mapped image data,
wherein the step (b) comprises the step of:
(b-1) skipping pixels of said first pictorial image data at a predetermined rate to obtain said second pictorial image data, wherein the step (b) comprises the step of:

(b-1) skipping pixels of said first pictorial image data at a predetermined skipping rate to obtain said second pictorial image data, wherein the step (d) comprises the steps of:

(d-1) directing said integrated image recorder to transfer said second pictorial image data to said front end processor;

(d-2) reading out said second pictorial image data from said memory means;

(d-3) transferring said second pictorial image data to said front end processor.

13. The method of claim 12, wherein the step (d-3) comprises the steps of:

(d-4) transferring to said front end processor said second pictorial image data together with first accompanying data, defining:

numbers of pixels forming said second pictorial image data in two directions defined on said picture.

14. The method of claim 13, wherein said first accompanying data further includes:

a file name of said second pictorial image data;

a field defining a number of bits representing said second pictorial image data per pixel; and data designating whether said second pictorial image is monochrome or color.

* * * * *